(12) United States Patent
von Rickenbach et al.

(10) Patent No.: US 11,797,503 B2
(45) Date of Patent: Oct. 24, 2023

(54) SYSTEMS AND METHODS FOR ENHANCED MAPPING AND CLASSIFICATION OF DATA

(71) Applicant: Thomson Reuters Enterprise Centre GmbH, Zug (CH)

(72) Inventors: David von Rickenbach, Baar (CH); David Oliver, London (GB); Daniella Tsar, Orpington (GB); Kim Hau, London (GB); Dorcas Mbwiti, Essex (GB); Johannes Schleith, London (GB); Guillaume Mosching, Geneva (CH); Sanzio Monti, Zurich (CH)

(73) Assignee: Thomson Reuters Enterprise Centre GmbH, Zug (CH)

( * ) Notice: Subject to any disclaimer, the term of this patent is extended or adjusted under 35 U.S.C. 154(b) by 100 days.

(21) Appl. No.: 17/068,818

(22) Filed: Oct. 12, 2020

(65) Prior Publication Data
US 2021/0026823 A1    Jan. 28, 2021

Related U.S. Application Data

(63) Continuation of application No. 16/181,680, filed on Nov. 6, 2018, now Pat. No. 10,803,033.
(Continued)

(51) Int. Cl.
*G06F 16/00* (2019.01)
*G06F 16/22* (2019.01)
(Continued)

(52) U.S. Cl.
CPC .......... *G06F 16/22* (2019.01); *G06F 11/0727* (2013.01); *G06F 11/0793* (2013.01);
(Continued)

(58) Field of Classification Search
CPC .. G06F 16/22; G06F 11/0727; G06F 11/0793; G06F 16/285; G06N 7/005; G06N 20/00; G06Q 40/12
See application file for complete search history.

(56) References Cited

U.S. PATENT DOCUMENTS 8,086,643 B1 * 12/2011 Tenorio .............. G06Q 10/0875
706/20
8,838,654 B1    9/2014 Hannah et al.
(Continued)

FOREIGN PATENT DOCUMENTS

WO    WO-2004/114148 A1    12/2004

OTHER PUBLICATIONS

International Search Report and Written Opinion issued for PCT Application No. PCT/IB2018/001625, dated Jul. 16, 2019, 12 pages.
(Continued)

*Primary Examiner* — Syed H Hasan
(74) *Attorney, Agent, or Firm* — Norton Rose Fulbright US LLP

(57) ABSTRACT

The present disclosure relates to systems and methods for enhanced mapping of transaction data to a target document, and for classifying line items of the mapped transaction data, using classification algorithms. Embodiments provide a system including a column mapping module to receive a target scheme specifying a target structure for the target document, receive transaction data having a source structure, and map at least one source column to at least one target column of the target columns based on application of classification algorithms to features identified from the source transaction data. The system also includes a row classification module to classify the rows of the mapped transaction data into classification categories. The system also includes a validation handler to receive validation input from a user, validat-
(Continued)

ing the column mapping and/or the row classification. The validating including accepting the recommendation or rejecting the recommendation and selecting a correct choice.

19 Claims, 10 Drawing Sheets

Related U.S. Application Data

(60) Provisional application No. 62/581,802, filed on Nov. 6, 2017.

(51) Int. Cl.
  *G06N 20/00* (2019.01)
  *G06F 11/07* (2006.01)
  *G06Q 40/12* (2023.01)
  *G06F 16/28* (2019.01)
  *G06N 7/01* (2023.01)

(52) U.S. Cl.
  CPC ............ *G06F 16/285* (2019.01); *G06N 7/01* (2023.01); *G06N 20/00* (2019.01); *G06Q 40/12* (2013.12)

(56) References Cited

U.S. PATENT DOCUMENTS

| | | | |
|---|---|---|---|
| 10,127,206 B2 | 11/2018 | Davis et al. | |
| 10,585,888 B2 | 3/2020 | Gulwani et al. | |
| 2002/0091782 A1* | 7/2002 | Benninghoff, III | G06Q 20/401 709/206 |
| 2002/0184145 A1* | 12/2002 | Sijacic | G06Q 30/04 705/40 |
| 2003/0105687 A1* | 6/2003 | Brass | G06Q 40/02 705/31 |
| 2003/0233297 A1* | 12/2003 | Campbell | G06Q 40/123 705/31 |
| 2004/0199489 A1* | 10/2004 | Barnes-Leon | G06Q 10/10 |
| 2007/0185651 A1* | 8/2007 | Motoyama | G01C 21/3878 701/454 |
| 2008/0027930 A1 | 1/2008 | Bohannon et al. | |
| 2011/0191215 A1* | 8/2011 | Nadler | G06Q 40/02 705/31 |
| 2013/0117268 A1 | 5/2013 | Smith et al. | |
| 2013/0198223 A1 | 8/2013 | Ahmed et al. | |
| 2013/0297661 A1* | 11/2013 | Jagota | G06F 16/11 707/822 |
| 2015/0278393 A1 | 10/2015 | Das et al. | |
| 2018/0218053 A1 | 8/2018 | Koneru | |
| 2019/0019411 A1* | 1/2019 | Sweeney | G08G 1/166 |
| 2019/0155801 A1 | 5/2019 | Karunanithi et al. | |
| 2020/0327152 A1* | 10/2020 | Beznos | G06Q 20/102 |

OTHER PUBLICATIONS

Google search results. Google.com. 2020.

* cited by examiner

FIG. 3A

| | | | | | |
|---|---|---|---|---|---|
| 301 | | | | | |
| 303a | ZLOTA 69, 00-120 WARSZAWA | 10 | 0.52 | 0.26 | 8 | 0.12 |
| 303b | UL. KOWSKA 5 M 4, 81-005 GDYNIA | 18 | 0.53 | 0.23 | 7 | 0.19 |
| 303c | GRECHOWSKA 208/28, 00-849 WARSZAWA | 19 | 0.50 | 0.33 | 10 | 0.08 |
| 303d | WILCZA 31 1 A, 00-544 WARSZAWA | 15 | 0.60 | 0.07 | 8 | 0.17 |
| 303e | BALTIC BUSINESS CENTRE, 81-819 GDYNIA | 20 | 0.76 | 0.14 | 5 | 0.11 |

FIG. 3B

| | | | | |
|---|---|---|---|---|
| 302 | | | | |
| 304a | 1 AND 1 INTERNET SP Z O O | 0.64 | 0.09 | 0.28 |
| | A AND P BUS USLUGI TRANSPORTOWE ADAM BRZYSEK | 0.84 | 0.00 | 0.16 |
| | ABSOLVENT PL SP Z O O | 0.76 | 0.00 | 0.24 |
| | ACI POLSKA STOWARZYSZENIE RYNKOW FINANSOWYCH | 0.91 | 0.00 | 0.09 |
| | ADAM DRZEWIECKI | 0.93 | 0.00 | 0.07 |
| | BLACK BOX NETWORK SERVICES UK LTD | 0.85 | 0.00 | 0.15 |
| 304g | CITY HOMES LTD SP Z O O | 0.74 | 0.00 | 0.26 |

FIG. 3C

| | 305 | 306 | 307 |
|---|---|---|---|
| 308a | 2017-07-20 | 2017-07-20 | 0 days |
| | 2017-07-27 | 2017-07-27 | 0 days |
| | 2017-07-06 | 2017-07-06 | 0 days |
| | 2017-07-24 | 2017-07-24 | 0 days |
| | 2017-07-08 | 2017-07-16 | 8 days |
| | 2017-06-28 | 2017-07-16 | 18 days |
| | 2017-06-22 | 2017-07-01 | 9 days |
| | 2017-06-28 | 2017-07-01 | 3 days |
| | 2017-06-11 | 2017-07-01 | 20 days |
| | 2017-07-05 | 2017-07-15 | 10 days |
| | 2017-07-20 | 2017-07-27 | 7 days |
| | 2017-07-13 | 2017-07-21 | 8 days |
| | 2017-06-22 | 2017-07-21 | 29 days |
| | 2017-06-28 | 2017-07-02 | 4 days |
| | 2017-06-23 | 2017-07-02 | 9 days |
| 308p | 2017-06-02 | 2017-07-02 | 30 days |

SYSTEMS AND METHODS FOR ENHANCED MAPPING AND CLASSIFICATION OF DATA

CROSS-REFERENCE TO RELATED APPLICATIONS

The present application is a continuation of U.S. patent application Ser. No. 16/181,680 filed Nov. 6, 2018 and entitled, "SYSTEMS AND METHODS FOR ENHANCED MAPPING AND CLASSIFICATION OF DATA," which claims priority to U.S. Provisional Application No. 62/581,802, filed Nov. 6, 2017 and entitled, "AUTOMATED MAPPING AND ERROR CORRECTION," the disclosures of which are incorporated by reference herein in their entirety.

TECHNICAL FIELD

The present subject matter is directed generally to data mapping and error correction, and more particularly to enhanced mapping and classification of transaction data using classification algorithms.

BACKGROUND

Organizations face many regulatory reporting requirements. In some cases, these reporting requirements vary from jurisdiction to jurisdiction. For example, one jurisdiction may require organizations to report transaction data using a particular reporting format or structure, while another jurisdiction requires organizations to report transaction data using a different reporting format or structure. This may be burdensome to organizations, especially organizations having a presence in many jurisdictions around the world. Adding to the burden, many organizations have internal data systems in which transaction data may be stored in different formats and structures. This may be due to the fact that different content management systems may be used within the same organization, or the organization may have different entities and/or subsidiaries. As a result, an organization's transaction data is not always stored in a neat and uniform standard.

One particular example of a transaction reporting framework is the Standard Audit File for Tax (SAF-T), a tax compliance reporting framework that has been enacted in various jurisdictions around the world. Under SAF-T, organizations are required to submit transaction data to various jurisdictions, wherein the various jurisdictions use the transaction data to determine any value added taxes (VAT) owed with respect to the reported transactions. Jurisdictions associated with SAF-T have generally put in place processes that outline how multi-national organizations are to submit transaction data to the respective tax authority. One of the difficulties with SAF-T is that each jurisdiction seems to specify their own structure for the transaction data report. In addition, the reports are required to be regularly submitted. As a results, organizations are forced to submit vast amounts of data, in different structures depending on the jurisdiction, from data stored in different formats, and at regular short intervals.

SUMMARY

The present application relates to systems and methods for enhanced mapping of transaction data to a target document having a target structure, and for classifying the mapped transaction data into appropriate classification categories. In one particular embodiment, a method of enhanced mapping of transaction data to a target document having a target structure, and for classifying the mapped transaction data into appropriate classification categories may be provided. The method may include receiving a target scheme specifying at least one target structure. The least one target structure may define target columns to be included in the target document, and the target columns may be associated with aspects of transaction data. The method may also include receiving source transaction data having at least one data structure. The at least one data structure may define at least one source column, which may be associated with an aspect of the source transaction data. The source transaction data may include one or more source rows corresponding to a different transaction. The method may further include mapping the at least one source column to at least one target column of the target columns to generate mapped transaction data. The mapping may include identifying at least one feature of the at least one source column, applying the identified at least one feature of the at least one source column to a classification algorithm, and determining, based on the classification algorithm, that the at least one feature indicates that the aspect associated with the at least one source column corresponds to the aspect associated with the at least one target column. The method may also include generating a structured report. The structured report may include at least the mapped transaction data structured in accordance with the at least one target structure. The structured report may be transmitted to a jurisdiction specifying the at least one target structure.

In a more detailed embodiment, the method may further include receiving a first user input validating the mapping of the at least one source column to the at least one target column. The validating the mapping may include one of: confirming the mapping, and rejecting the mapping and selecting a correct source column from the at least one source column to map to the at least one target column. In this more detailed embodiment, the method may also include classifying each row of the mapped transaction data into a respective classification category, and receiving a second user input validating the classification category of each row of the mapped transaction data. The validating the classification category may include one of: confirming the classification category, and rejecting the classification category and selecting a correct classification category.

In another embodiment, a system for enhanced mapping of data to a target document may be provided. The system may include a column mapping module configured to receive a target scheme specifying at least one target structure and source transaction data having at least one data structure. The at least one target structure may define target columns to be included in the target document, and the target columns may be associated with aspects of transaction data. The at least one data structure may define at least one source column, which may be associated with an aspect of the source transaction data. The source transaction data may include one or more source rows corresponding to a different transaction. The column mapping module may also be configured to map the at least one source column to at least one target column of the target columns to generate mapped transaction data. The mapping of the at least one source column to at least one target column of the target columns may include identifying at least one feature of the at least one source column, applying the identified at least one feature of the at least one source column to a classification algorithm, and determining, based on the classification algorithm, that the at least one feature indicates that the aspect associated with the at least one source column corresponds to the aspect associated with the at least one target column. The system may also include an Input/Output (I/O) unit configured to generate a structured report. The structured report may include at least the mapped transaction data structured in accordance with the at least one target structure. The I/O unit may also be configured to transmit the structured report to a jurisdiction specifying the at least one target structure.

In a more detailed embodiment, the system may also include a row classification module configured to classify each row of the mapped transaction data into a respective classification category. In this more detailed embodiment, the system may further include a validation handler configured to receive a first user input validating the mapping of the at least one source column to the at least one target column. The validating the mapping may include one of: confirming the mapping, and rejecting the mapping and selecting a correct source column from the at least one source column to map to the at least one target column. The validation handler may also be configured to receive a second user input validating the classification category of each row of the mapped transaction data. The validating the classification category may include one of: confirming the classification category, and rejecting the classification category and selecting a correct classification category.

In yet other embodiments, a computer-based tool for enhanced mapping of data to a target document may be provided. The computer-based tool may include non-transitory computer readable media having stored thereon computer code which, when executed by a processor, causes a computing device to perform operations. The operations may include receiving a target scheme specifying at least one target structure. The least one target structure may define target columns to be included in the target document, and the target columns may be associated with aspects of transaction data. The operations may also include receiving source transaction data having at least one data structure. The at least one data structure may define at least one source column, which may be associated with an aspect of the source transaction data. The source transaction data may include one or more source rows corresponding to a different transaction. The operations may further include mapping the at least one source column to at least one target column of the target columns to generate mapped transaction data. The mapping may include identifying at least one feature of the at least one source column, applying the identified at least one feature of the at least one source column to a classification algorithm, and determining, based on the classification algorithm, that the at least one feature indicates that the aspect associated with the at least one source column corresponds to the aspect associated with the at least one target column. The operations may also include generating a structured report. The structured report may include at least the mapped transaction data structured in accordance with the at least one target structure. The structured report may be transmitted to a jurisdiction specifying the at least one target structure.

In a more detailed embodiment, the operations may also include receiving a first user input validating the mapping of the at least one source column to the at least one target column. The validating the mapping may include one of: confirming the mapping, and rejecting the mapping and selecting a correct source column from the at least one source column to map to the at least one target column. In this more detailed embodiment, the operations may further include classifying each row of the mapped transaction data into a respective classification category, and receiving a second user input validating the classification category of each row of the mapped transaction data. The validating the classification category may include one of: confirming the classification category, and rejecting the classification category and selecting a correct classification category.

As used herein, a structure may refer to data structure and/or format which may define rules for encoding data. For example, a structure may refer to a data structure defined using an Extensible Markup Language (XML) file. In these cases, the XML structure may define the encoding of the data. For example, a target structure may include a target XML structure which defines the format and rules into which transaction data may be encoded.

It is also noted that as used herein, classification algorithms may include any combination of machine learning algorithms (e.g., regression algorithms, classification trees, vector analysis, etc.), statistical algorithms, and/or any algorithm configured to identify correlations and/or relationships within and between data, and to train a model such that the model may be used to classify data according to the training.

The foregoing broadly outlines the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 3A shows an example of data features in accordance with embodiments of the present disclosure;

FIG. 3B shows another example of data features in accordance with embodiments of the present disclosure;

FIG. 3C shows another example of data features in accordance with embodiments of the present disclosure;

FIG. 7A shows an example of data features in accordance with embodiments of the present disclosure;

FIG. 7B shows another example of data features in accordance with embodiments of the present disclosure;

FIG. 8 shows another example of the graphical user interface view configured in accordance with embodiments of the present disclosure.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Figure 1:
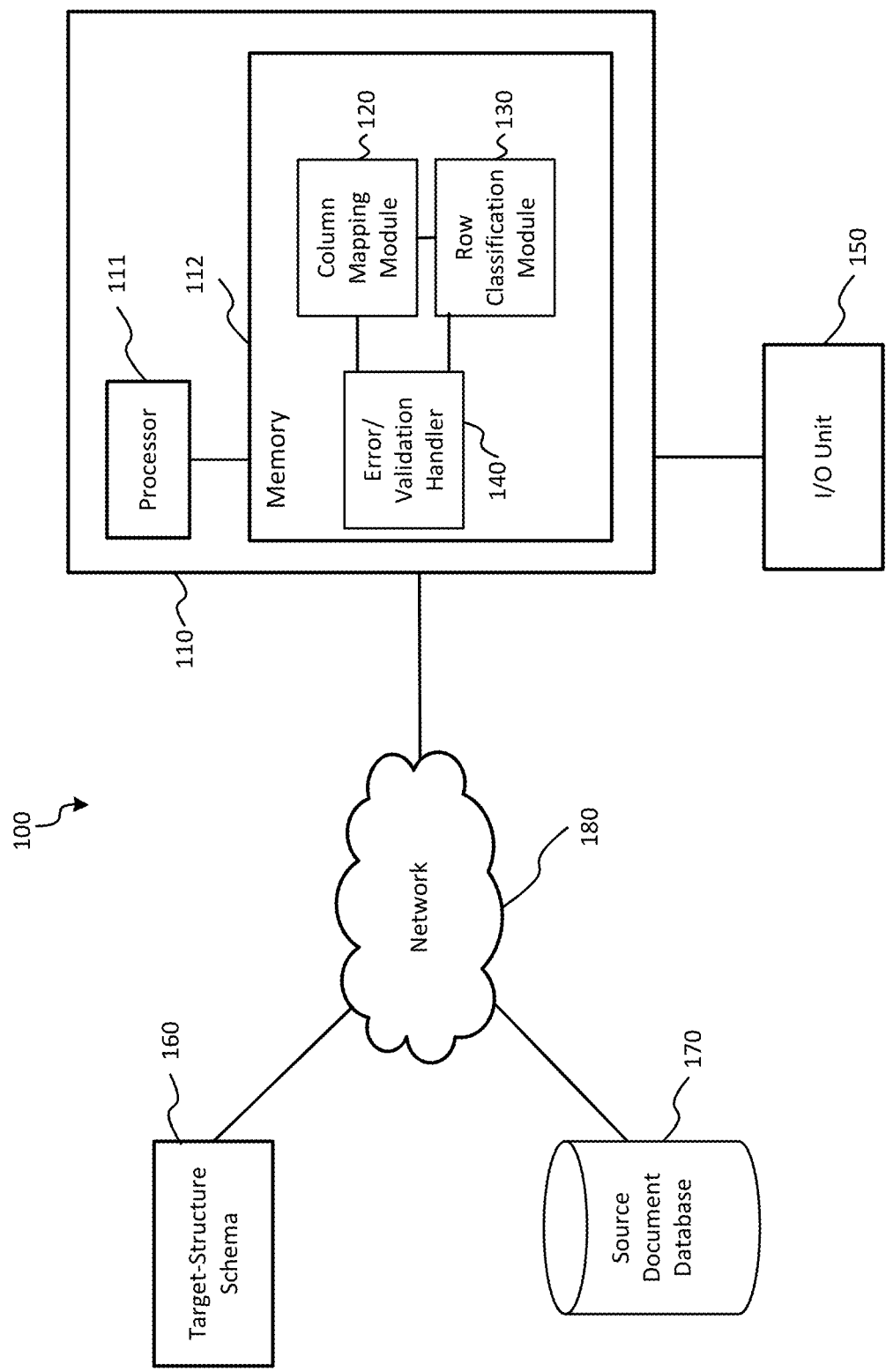
FIG. 1 shows a system configured to perform operations in accordance with embodiments of the present disclosure.

FIG. 1 is a block diagram of an exemplary system 100 configured with capabilities and functionality for enhanced mapping of data having at least one source structure to a target document defining at least one target structure, and for individually classifying line items of the mapped target document, by execution of classification algorithms in accordance with embodiments of the present application. As shown in FIG. 1, system 100 includes server 110, target-structure schema 160, source document database 170, and I/O unit 150. These components, and their individual components, discussed in more detailed below, may cooperatively operate to provide functionality in accordance with the discussion herein. For example, in operation according to embodiments, target-structure schema 160 and data from source document database 170 may be provided as input to server 110 via network 180. The various components of server 110 may cooperatively operate to provide an enhanced mapping of at least a portion of the data from source document database 170 to at least one structure defined by target-structure schema 160 by the execution of classification algorithms to generate a target document including the mapped data, in which line items of the target document may be classified individually, as will be discussed in more detail below. In embodiments, the enhanced mapping of the data and the generation of the target document may be performed automatically by system 100, or may include at least in part, manual intervention from an operator (e.g., operator input to validate mappings and/or classifications, operator input to select target structure scheme or source documents, operator input to correct errors, etc.).

Figure 2:
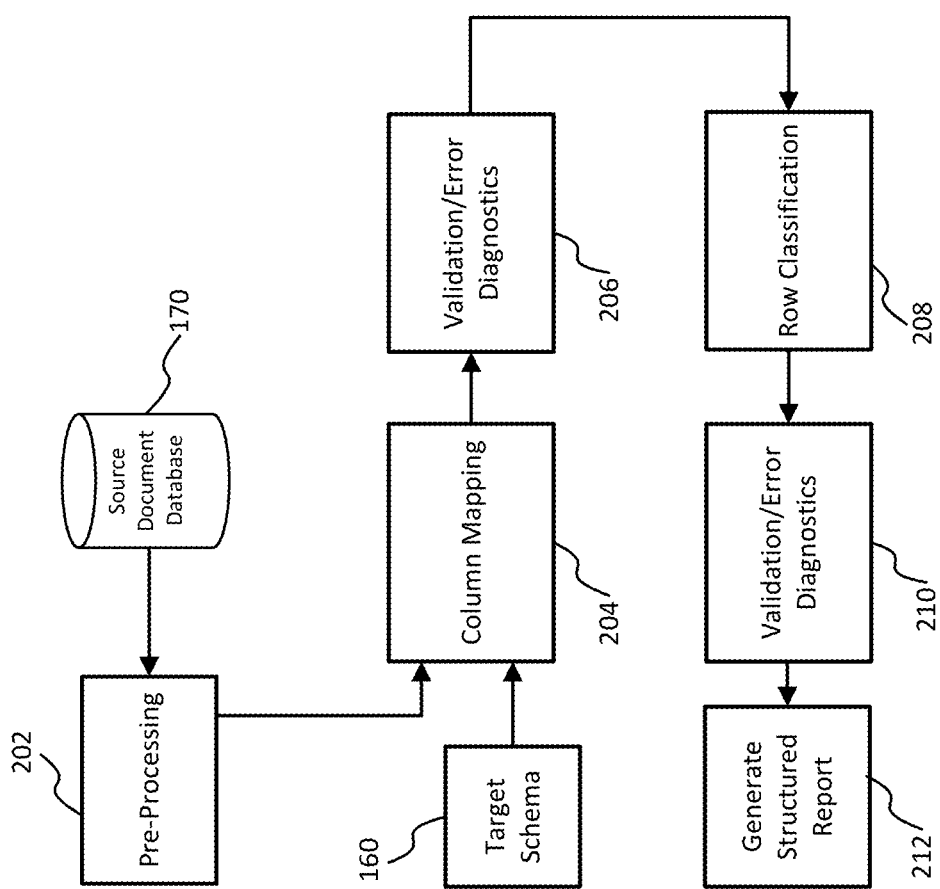
FIG. 2 shows a functional flow diagram illustrating an example flow executed to implement aspects of the present disclosure.

It is noted that various components of system 100 are illustrated as single and separate components in FIGS. 1 and 2. However, it will be appreciated that each of the various illustrated components may be implemented as a single component (e.g., a single application, server module, etc.), may be functional components of a single component, or the functionality of these various components may be distributed over multiple devices/components. In such aspects, the functionality of each respective component may be aggregated from the functionality of multiple modules residing in a single, or in multiple devices.

It is further noted that the functional blocks, and components thereof, of system 100 of embodiments of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for preforming the functions described herein.

In embodiments, source document database 170 may be configured to store data to be provided to server 110 for operations according to the present disclosure. For example, data/and or documents (e.g., invoices, transaction records, customer records, seller records, buyer records, product records, currency exchange information, etc.) may be stored in source document database 170. In embodiments, source document database 170 may include or may be part of an Enterprise Resource Planning (ERP) system, and or may include a database, or a plurality of databases, communicatively coupled to an ERP system. In embodiments, the data provided to server 110 from source document database 170 may include data related to transactions required to be externally reported in a particular structured scheme. As noted above, in some cases, the transaction data stored in source document database 170 may have different structures. For example, the transaction data may be related to transactions executed by different entities within an organization, or executed by different systems within the organization. As a result, in these cases, the resultant transaction data may be generated with different structures, and/or different information. In other cases, the transaction data may be stored using a single structure, although the single structure may be different than the structure defined by the target-structure schema of the target document. As such, it will be appreciated that the present disclosure provides an advantageous solution for addressing the above situations.

In aspects, the transaction data provided to server 110 from source document database 170 may include different source information items. Source information items may include, for example, line transaction information, which may identify a buyer, a seller, respective names and addresses, a date of transaction, a description of purchased goods, a description of services rendered, an invoice ID or bill number, information on currency (e.g., local currency, customer's currency, etc.), and internal transaction classification (e.g., an internal code classifying the transaction), etc.

Source information items may also include previously generated external reports. These previously generated reports may include documents that were previously manually generated, or may include target documents previously generated in accordance with the techniques disclosed herein. In any case, the previously generated external reports may be provided to server 110 from source document database 170, and in some embodiments, server 110 may use these previously generated external reports to facilitate the classification and mapping of the data to the target structures and documents.

Source information items may also include reference data. Reference data may refer to data not directly related to a particular transaction, but may refer to data generally related to the organization, to clients of the organization, to the transaction environment, etc. For example, reference data may include a list of names and/or addresses of entities with which the organization transacts on a regular basis (e.g., entities from/to which the organization usually buys/sells). In some embodiment, the reference data may be data extracted from the invoices. For example, image processing may be performed on an organization's invoices to identify the names and/or addresses of entities with which the organization transacts on a regular basis.

In addition or in the alternative, reference data may include the actual invoices. In some cases, line transaction information may include information that is not very descriptive. For example, although line transaction information may include a product or service description, the product or service description may not be very descriptive or may be actually missing. However, the descriptions in the invoices may be more descriptive. By providing the actual invoices to server 110, operations may be facilitated in these situations, as server 110 may be configured, in some embodiments, to obtain the appropriate information from the actual invoice when the information in the line transaction information is missing or inadequate.

Reference data may also include foreign exchange information. For example, some organizations may be multi-national and may execute international transactions. In these cases, the transaction may be billed in the organization's local currency, or may be billed in the currency of the second-party, which may be a different currency. However, the organization may still be subject to reporting tax information related to the transaction in local currency. By providing foreign exchange information to server 110, robust operations may be facilitated such that server 110 may be configured to enhance the data mapping to account for the difference in currencies.

It is noted that, in some embodiments, the data provided to server 110 from source document database 170 may be in the form of extract files. In some embodiments, the extract files may be generated from a pre-processor, as will be discussed in more detail below, and may include a structured file for each of the different source information items discussed above. Using extract files further optimizes the system because, during operations, the ERP system does not have to be queried for the different source information items, but rather, the pre-processed extract files may be used. In other embodiments, the extract files may be pre-generated, and may be obtained from source document database 170, which may include or may be part of an ERP system, and or may include a database, or a plurality of databases, communicatively coupled to an ERP system. In yet other embodiments, at least a part of the extract files may be uploaded by a user to document database 170 or to server 110.

In some embodiments, source document database 170 may be configured to store mapping and classification information generated by server 110 during operation. As will be described in more detail below, server 110 may be configured to implement enhanced mapping of data having a source structure into a target structure. Sever 110 may also be configured to individually classify line items from the mapped data. The resultant mapping and/or classification may be provided to source document database 170 and stored therein for subsequent reuse by server 110. In this manner, server 110 may reuse previously generated mapping and/or classifications instead of performing the mapping and/or classifications every time, thereby reducing computational requirements. Additionally, the reuse of the previously generated mapping and/or classifications may be based on whether the target structure has not changed. Thus, when it is determined that the target structure for a jurisdiction of interest has changed, based on the definitions in target-structure schema 160, the reuse of the previously generated mapping and/or classifications may be omitted and new mapping and/or classifications according to embodiments disclosed herein may be performed.

Target-structure schema 160 may be provided to server 110 via network 180 and may include at least one target structure into which the transaction data from source document database 170 may be mapped to the target document. As noted above, different jurisdictions may impose different transaction reporting requirements. For example, a first jurisdiction may require a transaction report including a first set of information and having a first structure, and a second jurisdiction may require a transaction report including a second set of information and having a second structure. In some cases, the first and second set of information, and the first and second structure, may be different from each other. In aspects, target-structure schema 160 may define the different information and the different structures to be reported for each of the different jurisdictions.

As mentioned above, target-structure schema 160 and data from source document database 170 may be provided as input to server 110 via network 180. Network 180 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc., that may be configured to facilitate communications between server 110, target-structure schema 160, and data from source document database 170. It is noted that in some embodiments, target-structure schema 160 and/or data from source document database 170 may be provided within server 110.

In embodiments, I/O unit 150 may include a display, and may be configured to display a graphical user interface (GUI) structured to facilitate input and output operations in accordance with aspects of the present disclosure. I/O unit 150 may be configured to accept input from operators that may be used to specify numerous parameters and values, such as specifying a jurisdiction for which reporting is to be performed, specifying the location of the data to be mapped to the report, etc. In some embodiments, as will be described in more detail below, I/O unit 150 may be configured to provide output which may present, display, or reproduce the mapping and classification perform during operations of system 100 to an operator, and may also be configured to accept an input from the operator to validate and/or correct the mapping and/or classification. In aspects, I/O unit 150 may be configured to output errors detected during operation and may accept input from the operator to correct the errors.

Server 110 may be configured to receive target-structure schema 160 and data from source document database 170, to provide enhanced mapping of at least a portion of the data from source document database 170 into a target-structure scheme defined by target-structure schema 160, to provide classification of line items of the mapped data, and to generate a target document including the individually-classified and mapped data. This functionality of server 110 may be provided by the cooperative operation of various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. Furthermore, those of skill in the art would recognize that although FIG. 1 illustrates components of server 110 as single blocks, the implementation of the components and of server 110 is not limited to a single component and, as described above, may be distributed over several devices or components.

As shown in FIG. 1, server 110 includes processor 111, memory 112, column mapping module 120, row classification module 130, and error/validation handler 140. Processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, as noted above, implementations of processor 111 may comprise code segments (e.g., software, firmware, and/or hardware logic) executable in hardware, such as a processor, to perform the tasks and functions described herein. In yet other aspects, processor 111 may be implemented as a combination of hardware and software. Processor 111 may be communicatively coupled to memory 112.

Memory 112 may comprise one or more semiconductor memory devices, read only memory (ROM) devices, random access memory (RAM) devices, one or more hard disk drives (HDDs), flash memory devices, solid state drives (SSDs), erasable ROM (EROM), compact disk ROM (CD-ROM), optical disks, other devices configured to store data in a persistent or non-persistent state, network memory, cloud memory, local memory, or a combination of different memory devices. Memory 112 may comprise a processor readable medium configured to store one or more instruction sets (e.g., software, firmware, etc.) which, when executed by a processor (e.g., one or more processors of processor 111), perform tasks and functions as described herein.

Column mapping module 120 may be configured to detect a correspondence of fields from transaction data received from source document database 170 to fields of a target structure, and to aggregate the appropriate data based on the detection to generate a target document. For example, transaction data received from source document database 170 may be structured as a table of columns and rows, with each column indicating an aspect of the transaction data (e.g., name, address, invoice reference number, description, date, gross amount, tax amount, etc.), and each row indicating a different transaction. In addition, target-structure schema 160 may define a target structure for reporting the transaction data for a particular jurisdiction. The target structure may define aspects of the transactions for each column, and the columns in the target structure may be different than the columns in the source structure. In aspects, column mapping module 120 may be configured to identify which columns in the source structure correspond to the columns in the target structure. Column mapping module 120 may also be configured to aggregate the data from the identified columns into a target document in which the columns correspond to the target structure, and the mapped data in the columns of the target document correspond to the appropriate data from the transaction data. Each row in the mapped data of the target document corresponds to a transaction.

It is noted that the use of the phrases "column mapping" and "row classification" herein are not intended to be limited to mapping a column and classifying a row. Rather, "column mapping" as used herein refers to detecting which aspects of data in a source structure correspond to aspects in a target structure. "Row classification" as used herein refers to determining a classification category for a particular line item within the mapped data. "Column mapping" and "row mapping" are used due to the prevailing use of table columns to indicate different aspects of data and table rows to indicate different line items. For example, data may be obtained directly from an invoice. The various data may be obtained from various locations within the invoice and may be mapped to a target structure, and classified. However, the data in the invoice may not be arranged as columns and/or rows.

In aspects, column mapping module 120 may be configured to detect the correspondence of fields from transaction data received from source document database 170 to fields of the target structure by applying classification models to the transaction data. The classification model may include features that are fed into algorithms, such as machine learning and/or statistical algorithms, in order to classify the transaction data. In aspects, the columns of the target structure, e.g., the aspects of the data that is to be mapped to each column in the target document, may exhibit a set of features. Column mapping module 120 may be configured to identify these features in the target columns. In some cases, the features may be derived from sample data, and/or may be derived from knowledge of the target structure (e.g., a column header in an organization's database is likely to be similar to a transaction report header for a particular jurisdiction), and may be used to train a classification model to identify columns based on the features. Thus, column mapping module 120 may analyze headers and transaction data for a particular column in the transaction data provided from source document database 170 and may determine, with a particular confidence in some embodiments, that the column exhibits features of an address, or a name, or a gross amount, or a net amount, etc. as appropriately based on the features. The identification of features is discussed in more detail below.

Row classification module 130 may be configured to classify each row in the transaction data mapped by column mapping module 120 into an appropriate category. In tax reporting applications, row classification module 130 may be configured to classify each row in the transaction data mapped by column mapping module 120 into an appropriate tax category (e.g., consulting transaction, stationery goods, food and beverages) for the corresponding jurisdiction, as each of transactions may incur a different tax rate.

In aspects, row classification module 130 may be configured to classify each row in the data mapped by column mapping module 120 into an appropriate category by applying classification models to the mapped transaction data. As with column mapping, the classification model used by row classification module may include features that are fed into algorithms, such as machine learning and/or statistical algorithms, in order to classify the mapped transaction data. In aspects, the transaction data in the rows of the mapped transaction data may exhibit features. Row classification module 130 may be configured to identify these features and may input the features into a trained classification model to identify a classification for each of the rows.

In aspects, classifying the rows into an appropriate category may include generating a classification code. In classifying each row in the data mapped by column mapping module 120 into an appropriate category, row classification module 130 may use the transaction data itself, e.g., the transaction data of the columns mapped to the target document, such as any of buyer, seller, amount, gross amount, tax amount, fees, description of product/service, internal classification codes, etc. It is noted that, although in some cases internal classification codes may be provided for the transactions, it may be determined that the provided classification code does not actually align to a jurisdiction classification. In these cases, row classification module 130 may be configured to provide an appropriate classification based on the transaction data and the jurisdictional requirement.

In some embodiments, the column mapping provided by column mapping module 120 and the row classification provided by row classification module 130 may be probabilistic predictions, and may include a confidence level indicator. For example, column mapping module 120 may probabilistically assign features associated with a particular target column to a particular source, based on features as discussed herein. In these cases, for each target column, a confidence level indicator indicating the likelihood that the identified source column has been correctly identified as corresponding to the target column may be provided. In another example, row classification module 130 may probabilistically classify a row in a mapped target document as a particular category. In this case, a confidence level indicator indicating the likelihood that the classification is correct may be provided. In aspects, the confidence level indicator may be a numerical confidence score or may be a color indicator. In some embodiments, the indicator may be presented to the operator.

Error/validation handler 140 may be configured to provide error diagnostics and operator validation. As noted above, the column mapping provided by column mapping module 120 and the row classification provided by row classification module 130 may be probabilistic predictions. Error/validation handler 140 provides for a way to validate the probabilistic predictions of the column mapping and the row classification. In aspects, as discussed in more detail below with respect to FIG. 2, the column mapping and the row classification are presented to the operator, along confidence level indicators in some embodiments, via a GUI of I/O controller 150. The operator may validate the predictions, or may instead indicate that the prediction is not correct, or desirable, and may also provide a correct selection. In some implementations, the operator validation may result in updating of the column mapping and/or row classification. The updating may be performed in real-time. Thus, as the operator validates, e.g., either confirms or rejects, a recommended mapping and/or classification, the recommendations are updated in real-time and in response to the validation.

In embodiments, the operator validation, either confirming or rejecting the system's recommendation, may be used to further train the classification models used to perform the column mapping and the row classification.

With respect to column mapping, in some embodiments, the operator is presented with only the top n recommendations from the identified source column candidates for each target column, along with a confidence level indicator for each source column candidate. The operator may select one of the n recommendations as the appropriate mapping for the target column. This process may be repeated for each target column in the target structure.

In some embodiments, error/validation handler 140 may also provide error handling functionality. Error/validation handler 140 may process the transaction data as well as the mapped transaction data, and may determine errors in the data. For example, error/validation handler 140 may determine missing items in the data, typographical errors, data in the wrong format, numbers in the wrong format, net amount, gross amount, and tax amounts that do not add up, etc. In aspects, error/validation handler 140 may perform this functionality based on a machine learning model. The machine learning model may be previously trained using sampled, labeled data. Error/validation handler 140 may also provide validation of foreign currency exchange rates used for international transactions.

FIG. 2 shows a high level flow diagram of operation of a system configured in accordance with aspects of the present disclosure for enhanced mapping of data having at least one source structure to a target document defining at least one target structure, and for individually classifying line items of the mapped target document, by execution of classification algorithms in accordance with embodiments of the present application. For example, the functions illustrated in the example blocks shown in FIG. 2 may be performed by system 100 of FIG. 1 according to embodiments herein.

In general terms, in embodiments of the present disclosure, column mapping and row classification includes identifying features that pertain to the columns and/or rows of interest. In embodiments, features of the respective data (e.g., columns or rows) may be defined from various aspects of the transaction data. These features may be used as inputs to machine learning and/or statistical algorithms. The various aspects of the transaction data defining the respective features may include single element features. For example, a particular column may correspond to address data. In this case, a feature of an address may be based on the number of alpha, numeric, and space characters in the corresponding data. The various aspects of the transaction data defining the respective features may include column-based statistics. For example, a particular source column may correspond to a transaction reference number. In this case, a feature of a transaction reference number may be that transaction reference numbers should be unique values within each column. The various aspects of the transaction data defining the respective features may also include columns headers. For example, a particular source column may correspond to a vendor's name. In this case, a feature of the source column may include whether the source column includes the word "name" in the header. The various aspects of the transaction data defining the respective features may also include relationships between statistics of columns. For example, two particular source columns may correspond to a date of sale and data of issue, respectively. In this case, a feature may include whether the date of sale is on average earlier than the date of issue, or vice-versa. The various aspects of the transaction data defining the respective features may also include the relation between elements in a row. For example, a particular row of mapped data may include two columns corresponding to a gross amount and a tax amount, respectively. In this case, a feature of the row may include that the tax amount is typically a fraction of gross amount (e.g., 0%, 5%, 8%, 23%, etc.). As noted above, in some embodiments, some of the features may be derived from sample data, and/or may be derived from knowledge of the target.

Embodiments of the present disclosure, as will be described in more detail below, may use at least one or two complimentary approaches in providing the functionality described here. One approach may include an algorithm to attempt a "best overall mapping." This may be referred to as the Hungarian algorithm. In this approach, the mapping and classification are performed completely automatically, without validation from the operator. This approach has the advantage of being highly convenient, as no operator intervention is performed, but may not be able to recover from misclassifications. A second approach is a "one-at-a-time" approach, in which the column mapping is performed one-column-at-a-time, with an operator confirming each choice, and the row classification is performed using operator validation and updating the row classification recommendations as the operator provides validation. This "one-at-a-time" approach may be more suitable when considering a small amount of a column. In this approach, machine learning algorithms are used to predict the probability of a column mapping or row classification being correct. This approach, however, is highly susceptible to user error. Applicant notes that the solution described herein, which employs a combination of the two approaches discussed above, is superior, and thus, provides an advantage.

One application of the techniques and systems disclosed herein may be in tax reporting. As noted above, organizations may be required to report transactions in order to determine any taxes owed from the transactions. However, different jurisdictions may have different tax reporting requirements. The different tax reporting requirements may include different information to be included in the tax report, and different formats for how the transaction data is to be structured in the report. Adding to that, organizations may store the transaction data in their internal systems in various formats, depending on what entity within the organization generated the transaction data. Aspects of the present disclosure provide an advantageous system that allows an organization to meet the reporting requirements by providing an enhanced mapping of the organization's transaction data to the target structured report, including classifying the transactions in the mapped target report into appropriate tax classifications. It is again noted that the discussion that follows, which is directed to tax reporting, is merely an example embodiment and should not be construed as limiting in any way.

In an optional embodiment, at block 202, data from source document database 170 is pre-processed. In some embodiments, pre-processing the data from source document database 170 may include extracting particular data from transaction data in source document database 170 and generating extract files corresponding to different source information items of the transaction data (e.g., line transaction information, previously generated external reports, reference data such as names and addresses, invoices, and/or daily foreign currency exchange rates, etc.). In aspects, the extract files may be provided as a structured file for each of the different source information. In other embodiments, the extract files may be pre-generated, and pre-processing the data may include obtaining the extract files from source document database 170, which may include or may be part of an ERP system, and or may include a database, or a plurality of databases, communicatively coupled to an ERP system. In yet other embodiments, pre-processing the data may include a user uploading at least part of the extract files either to document database 170 or to server 110. In other embodiments, pre-processing may include determining and correcting errors in the extract files in order to mitigate situations in which the data in the extract files is found in multi columns incorrectly.

At block 204, column mapping is performed. Column mapping may include receiving the transaction data and target schema. In aspects, the transaction data may be structured as tables of columns and rows, with each column indicating an aspect of the transaction data (e.g., name, address, invoice reference number, description, date, gross amount, tax amount, etc.), and each row indicating a different transaction. The target schema may define a target structure for reporting the transaction data for a particular jurisdiction, and the target structure may define the target columns to be included in the target document. In aspects, a classification model may be applied to the transaction data to detect source columns from the transaction data (e.g., line transaction information) that may correspond to a target column in the target structure for the jurisdiction. In aspects, one or more source columns may be identified as candidates for the target column. The classification model applied to the transaction data may identify features of a candidate source column and may execute classification algorithms, using the identified features as inputs, to determine that the features of the candidate column correspond to a particular target column. Candidate source columns may be identified for each target column defined in the target structure. Once candidate source columns are identified for each target column defined in the target structure, the identified source columns are aggregated by target columns. For example, a source column identified as a candidate for a particular target column is aggregated with every other source column identified as a candidate for that same particular target column. The same aggregation may be done for all target columns. In embodiments, column mapping module 120 may provide the execution environment for the column mapping.

As noted above, column mapping may include identifying features that pertain to the source columns. In aspects, features of the respective column data may be defined from various aspects of the transaction data. The transaction data in each of the columns may be analyzed to determine whether the transaction data corresponds to the features. For example, with respect to identifying source columns corresponding to address data, several features may be used. As shown in FIG. 3A, features that may be used to identify source columns related to address data may include the total number of alpha characters in the respective element string, the fraction of the string that is alpha characters, the number of numerals in the string, the fraction of the string that is numerals, the number of spaces in the string, and the fraction of the string that is spaces. Other features that may be used to identify source columns related to address data may include the total length string, use or a term in the string that is typically associated with an address, such as "Street," "St," "Ave," "Blvd," etc., use of the term "address" in the header field of the source column, etc. In aspects, the analysis of phrases and terms to determine whether they match a particular phrase or term may include using a regular expression match or a Levenshtein distance algorithm, which may provide the "distance" between two words. In some embodiments, previously generated reports may be used to calibrate these features.

In one example, for source column 301, with a header labeled "Address," each of the above described features may be extracted for each of transactions 303a-e. In aspects, each of the features extracted from transactions 303a-e may be provided as input to a classification algorithm, which may execute and determine, with a certain confidence level, whether source column 301 may correspond to an address column, or may determine that source column 301 may correspond to another target column. If it is determined that source column 301 may correspond to a particular target column, source column 301 may be deemed a candidate source column for the particular target column, and the confidence level determined by the classification algorithm may be provided with source column 301.

With reference to FIG. 3B, several features may be used to identify source columns corresponding to names, such as a contractors name, a buyer's name, a seller's name, etc. As shown in FIG. 3B, features that may be used to identify source columns related to name data may include the total number of alpha characters in the respective element string, the fraction of the string that is alpha characters, the number of numerals in the string, the fraction of the string that is numerals, the number of spaces in the string, and the fraction of the string that is spaces. Other features that may be used to identify source columns related to name data may include the total length string, use or a term in the string that is typically associated with names, such as "LTD," "Group," "Agency," "Corporation," etc., use of the term "name" in the header field of the source column, etc. In aspects, the analysis of phrases and terms to determine whether they match a particular phrase or term may include using a regular expression match or a Levenshtein distance algorithm, which may provide the "distance" between two words. In some embodiments, previously generated reports may be used to calibrate these features and identify previous names used.

In one example, for source column 302, with a header labeled "Name", each of the above described features may be extracted for each of transactions 304a-g. In aspects, each of the features extracted from transactions 304a-g may be provided as input to a classification algorithm, which may execute and determine, with a certain confidence level, whether source column 302 may correspond to a name column, or may determine that source column 302 may correspond to another target column. If it is determined that source column 302 may correspond to a particular target column, source column 302 may be deemed a candidate source column for the particular target column, and the confidence level determined by the classification algorithm may be provided with source column 302.

In yet another example, with reference to FIG. 3C, several features may be used to identify source columns corresponding to date of issue (e.g., date hen invoice was issued) and data of sale. As shown in FIG. 3C, features that may be used to identify source columns related to date of issue and date of sale data may include whether the data element may be parsed as a date. For example, the data element may analyzed to determine whether a standard software program is able to parse the data element as a date. The particular format of the data element may be considered to determine if the format matches one of several predetermined date formats. Other features that may be used to identify source columns related to date of issue and date of sale data may include the use of the term "date" in the header field of the source column. In some cases, one date is typically earlier or later than the other date. For example, the date of issue may be later than the date of sale. In these cases, another features may be constructed to identify date of issue and date of sale data that includes measuring whether a first date is on average earlier or later than the other date. In some embodiments, previously generated reports may be used to calibrate these features to determine the average time between issue and sale.

In one example, for source columns 305 and 306, with respective headers labeled "date1" and "date2," an average date difference feature 307 may be extracted for each of transactions 308a-p. In aspects, the date difference feature 307 extracted from transactions 308a-p may be provided as input to a classification algorithm, which may execute and determine, with a certain confidence level, whether source columns 305 and 306 may correspond to date of issue and date of sale columns, or may determine whether source columns 305 and 306 may correspond to target columns. If it is determined that source columns 305 and 306 may correspond to date of issue and date of sale target columns, source columns 305 and 306 may be deemed candidate source columns for the date of issue and date of sale target columns, and the confidence level determined by the classification algorithm may be provided with source columns 305 and 306.

It should be noted, although features were discussed above with respect to address, name, and date data, a similar process may be performed to identify features for other types of data such as invoice numbers, amounts, etc. Thus, the description of features related to address, name, and date data above should not be construed to be limiting in any way.

As noted above, column mapping may include aggregating source columns identified as candidates for each target column of the target document defined by the target structure for the jurisdiction for which the report is being generate. In aspects, the aggregation of the candidate columns may facilitate validation operations. Referring back to FIG. 2, at block 206, validation and/or error diagnostics may be performed. Validation may include presenting the source column candidates for each target column in the target structure to an operator for validation. In aspects, error/validation handler 140 and I/O unit 150 may cooperatively provide the execution environment for presenting the source column candidates for each target column to the operator via a GUI.

Figure 4:
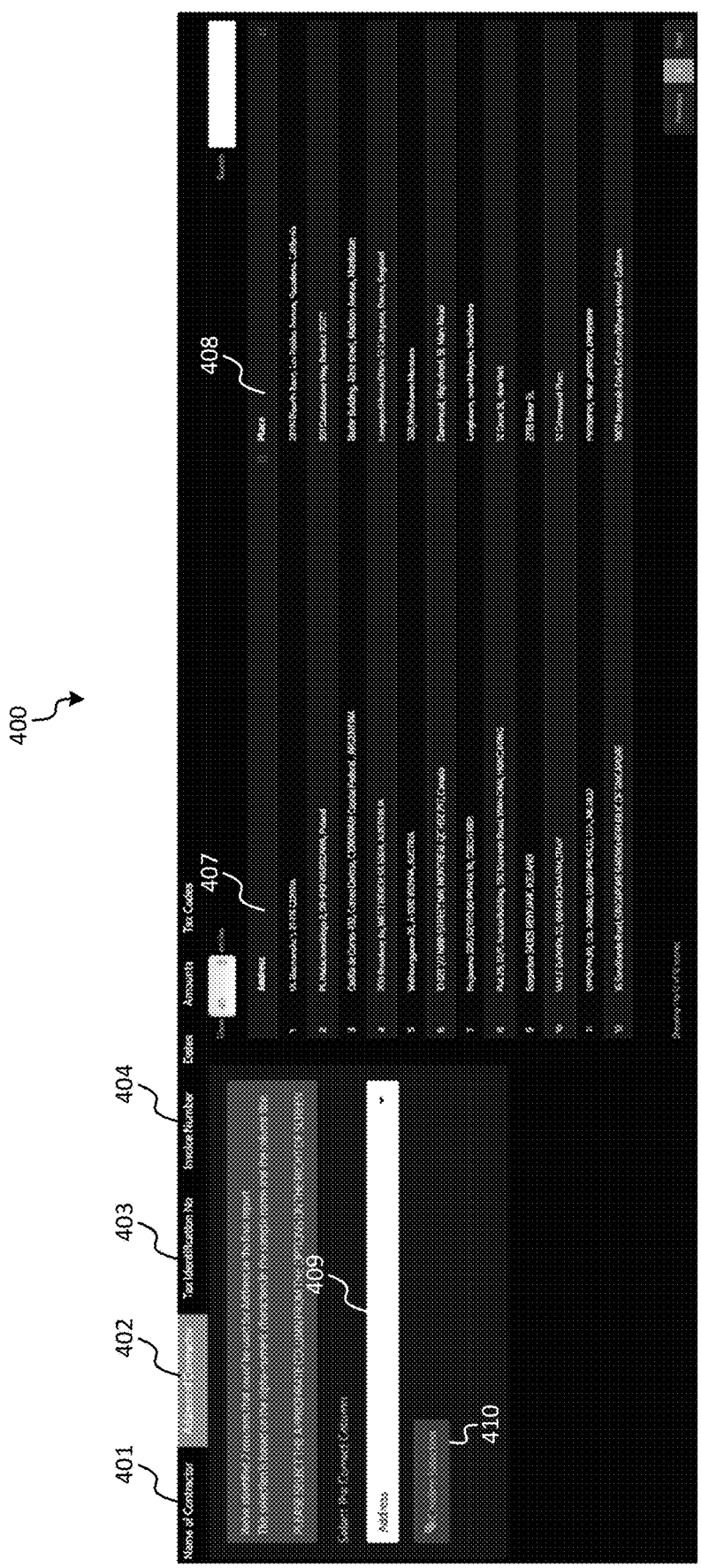
FIG. 4 shows an example of a graphical user interface view configured in accordance with embodiments of the present disclosure.

For example, as shown in FIG. 4, GUI 400 may be presented to an operator for validation. In embodiments, each of tabs 401-404 may correspond to a target column of the target structure. As the target columns of the target structure are based on the target schema for the particular jurisdiction, it will be appreciated that, for different jurisdictions, the number and type of tabs in GUI 400 may be different. As can be seen in FIG. 4, tab 402 "Address of Contractor" has been selected, and two source columns 407 "Address" and 408 "Place" have been identified as candidates for target column 402. In some embodiments, a confidence level may also be provided to indicate the level of confidence for each of source columns 407 and 408. In some aspects, the order of presentation may indicate a ranked level of confidence, where, for example, source column 407 being presented in a higher graphical position, e.g. to the left of source column 408, may indicate that the confidence level of source column 407 may be higher. In embodiments, more than two source columns may have been identified as candidates for target column 402, however, only the top n source columns, e.g., the n source columns with the highest level of confidence may be presented to the operator for validation. In this case, for n=2, source columns 407 and 408 may be represent the top two source columns.

In aspects, GUI control element 410 may be provided to execute validation of a selected source column as the appropriate mapping to the target column. For example, dropdown menu 409 may include the candidate source columns, and an operator may choose from the different selections to identify the source column correctly mapping to the target column. In aspects, dropdown menu 409 may default to the source column recommended by the system, in which case the operator may validate the recommendation by activating GUI control element 410 without having to scroll through dropdown menu 409. A similar process may be performed to validate each of the target columns represented by tabs 401-404.

Figure 5:
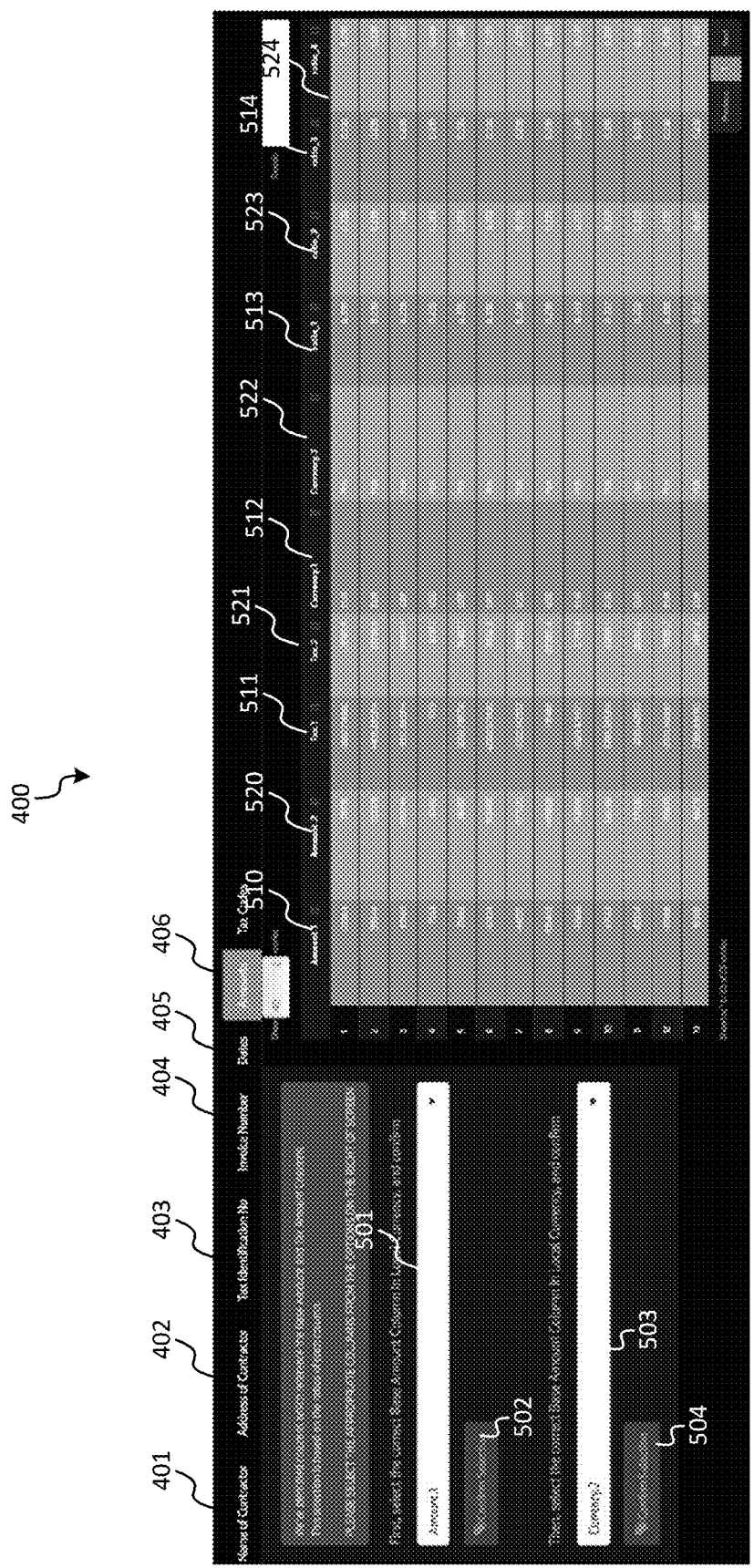
FIG. 5 shows another example of the graphical user interface view configured in accordance with embodiments of the present disclosure.

As shown in FIG. 5, tab 406 "Amounts" may be selected. In this case, tab 406 may include validation for target columns directed to amounts, which may include more than one target column. For example, tab 406 may be configured for validation of target columns for "Base Amount" and "Tax Amount." In this case, an operator may be presented with two GUI control elements 502 and 504 and two dropdown menus 501 and 503 for validating each of the target columns, in a similar manner as described above with respect to FIG. 4. In some embodiments, the operator may be instructed to first validate one of the target columns, and then subsequently validate the other target column. For each target column, one or more candidate source columns may be presented. For example, for target column "Base Amount," candidate source columns 510 and 520 may be presented to the operator. For target column "Tax Amount," candidate source columns 511 and 521 may be presented to the operator. In addition, reference data may be provided to facilitate validation. For example, currency information 512 and 522, and ratio information 513, 514, 523, and 524 may be provided. In aspects, currency information 512, and ratio information 513, 514 may correspond to columns 510 and 511, and thus, may be used by the operator to determine whether the base amount in column 510 and the tax amount in column 511 correctly correspond to each other. Similarly, currency information 522, and ratio information 523, 524 may correspond to columns 520 and 521, and thus, may be used by the operator to determine whether the base amount in column 520 and the tax amount in column 521 correctly correspond to each other.

Figure 6:
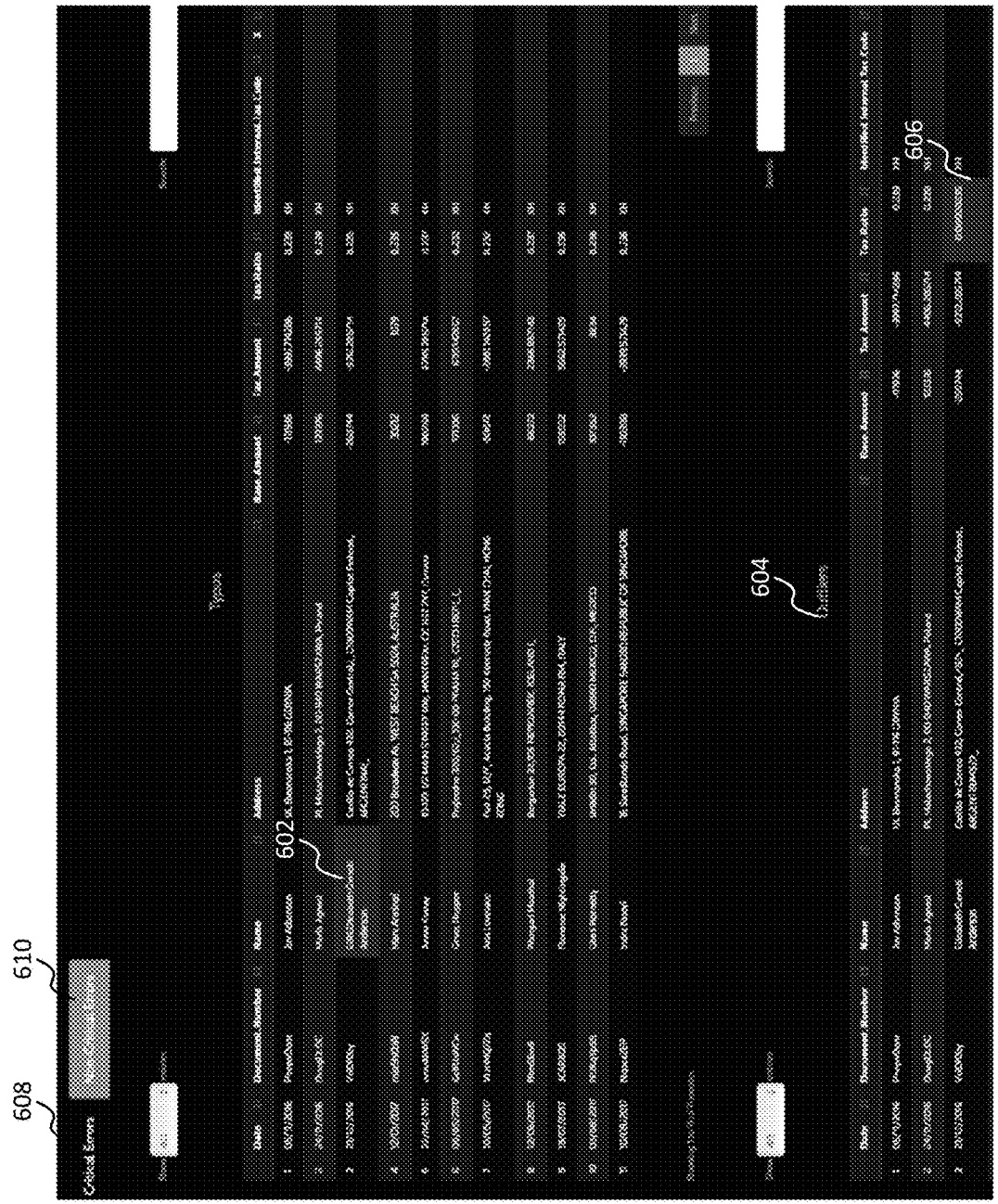
FIG. 6 shows another example of the graphical user interface view configured in accordance with embodiments of the present disclosure.

Referring back to FIG. 2, at block 206, error diagnostics may also be performed. Error diagnostics may include identifying any error in the mapped data. For example, missing items in the data, typographical errors, data in the wrong format, numbers in the wrong format, net amount, gross amount, and tax amount do not add up, etc. may be determined. Although error diagnostics functionality has been described after column mapping operations, it is noted that, in some aspects, error diagnostics may be performed prior to the column mapping, and thus, the error diagnostics may include identifying any error in the transaction data. For example, with reference to FIG. 6, transaction data may be analyzed to determine any errors before column mapping is performed. In this case, error diagnostics may yield critical errors 608 and non-critical errors 610. In embodiments, critical errors may include errors which may prevent any further mapping operations in the data. Non-critical errors may include errors that may not prevent further mapping operations, but which may results in skewed or incorrect data. For example, typo 602 and 606 may be identified. In some embodiments, the transaction data that includes errors may be edited inline, or may be changed at the input file (e.g., at source document database 170). In aspects, inline editing a particular transaction may also modify the corresponding file in the source document database 170 in order to ensure consistency. In addition, error diagnostics may also identified transaction data which may be considered outlier data 604. It is noted that, in embodiments, changes made to transaction data may be auditable. In these cases, modifications to transaction data based on identified errors (e.g., typos and/or outlier data) should be made traceable. Therefore, in these cases, a record of the modifications to the transaction data may be maintained.

At block 208, row classification is performed. Row classification may include classifying each row in the transaction data mapped at block 204 into an appropriate category. As mentioned above, each row of the mapped transaction data may correspond to a transaction. In tax reporting applications, row classification may include classifying each row/transaction in the mapped transaction data into an appropriate tax category (e.g., consulting transaction, stationery goods, food and beverages) for the corresponding jurisdiction. In embodiments, row classification module 130 may provide the execution environment for the row classification.

In aspects, row classification may include classifying each row in the mapped transaction data into an appropriate category by applying classification algorithms to the mapped transaction data. In some embodiments, features of the mapped transaction data are input into machine learning and/or statistical algorithms to classify each of the rows in the mapped transaction data. In some embodiments, row classification may include identifying columns in the mapped transaction data to be used in the row classification. These columns to be used may include columns corresponding to gross amounts, net amounts, and tax amounts. It is noted that, typically, gross amount=net amount+tax amount. As such, in order to classify rows of the mapped transaction data with tax classifications, amounts columns may be first identified.

Figures 7A, 7B:
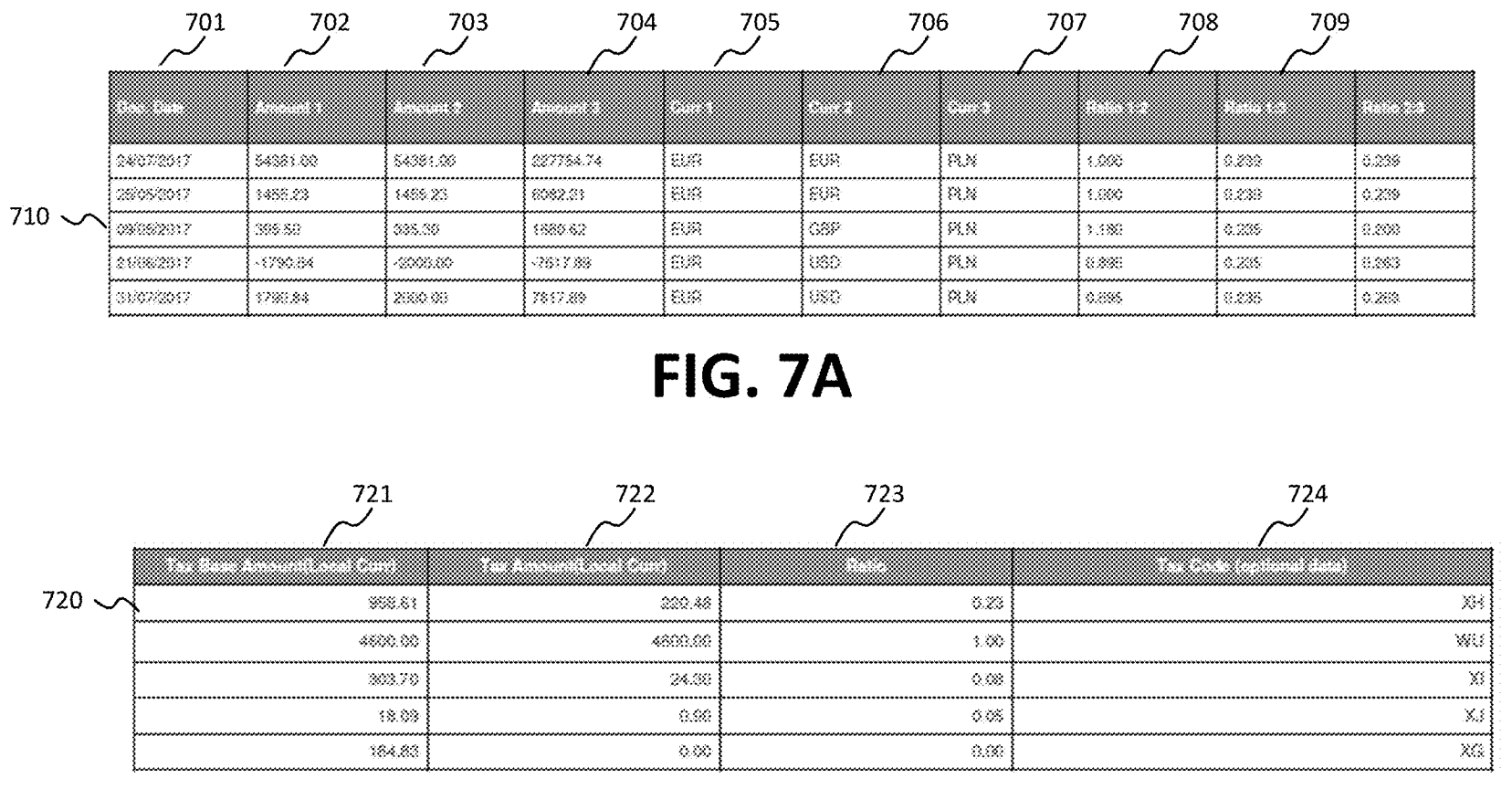

Identifying amounts columns in the mapped transaction data may include identifying whether the values in a particular mapped column are all values with a type "float," which typically include two decimal places. In some aspects, this feature of a mapped column data may distinguish the mapped column, as an amounts columns, from similar columns, such as integers columns. Other features that may be used to identify amounts columns may include using currency data, along with foreign currency exchange information, and date information. For example, as shown in FIG. 7A, a date may be used in conjunction with currency information in order to determine amounts columns. For transaction 710, for example, column 701 may indicate a date, and columns 702-704 may indicate amounts 1-3, respectively. Columns 705-707 may indicate currency information related to amounts 1-3, respectively. For example, amounts 1 may be identified as EUR, amount 2 as GBP, and amount 3 as PLN. Columns, 708 and 709 may indicate a ratio of amount 1 to amounts 2 and 3, respectively, with the respective ratios being 1.18 and 0.235. Reference data, such as the reference data described above, may provide exchange rates for EUR-GBP and EUR-PLN for the particular date of transaction 710. The exchange rates provided in the reference data may be matched against the ratios in columns 708 and 709 to determine whether amounts 1-3 are actual amounts. If the ratios are consistent with the exchange rates, then columns 702-704 may be considered amounts columns.

Having identified amounts columns in the mapped transaction to be used in the row classification, row classification may include identifying a correct classification code based on the row information (e.g., amounts columns). In a particular example, and noting that typically gross amount=net amount+tax amount, the amounts columns may be analyzed to determine which of the amounts columns correspond to each of gross, net, and tax amounts. In embodiments, knowledge of tax jurisdiction requirements, such as tax rates, may facilitate identification of the amounts columns as gross, net, and tax amounts. For example, it may be known that in a particular jurisdiction, tax rates may be one of 0%, 5%, 8%, and 23%. In this case, ratios may be calculated for each of the amounts columns, and where a ratio indicates one of the tax rates of the jurisdiction, the associated amounts may be deemed a base and tax amount as appropriate. For example, as shown in FIG. 7B, for transaction 720, a Tax Base 712 and Tax Amount 722 have been identified based on a ratio 723 of 0.23. Ratio 723 indicates one of the tax rates and thus, it may be deemed a tax rate. In aspects, the tax rate may be used to identify a tax code applicable to the transaction. For example, in some jurisdictions, different tax rates may be applicable to different types of transactions.

In some embodiments, an internal classification code 724 may be provided in the transaction data. This internal classification code may be internal to the organization, and may not be accurate. In embodiments, the internal classification code may be determined based on previously generated reports which may include an internal classification code for similar transactions. As noted above, in some embodiments, the tax rate and internal rate code may be features that may be input into classification algorithms, along with various other features of the mapped transaction data as described above, in order to classify the rows/transactions of the mapped transaction data.

In embodiments, row classification may include providing a classification code for each row, along with an indication of the confidence level for each classified row and the classified row data, for presentation to an operator. Referring back to FIG. 2, at block 208, validation and/or error diagnostics may be performed. In aspects, validation and error diagnostics at block 210 may be similar to the validation and error diagnostics performed at block 206, except that the validation and error diagnostics at block 210 may be performed with respect to the row data classified at block 208. In aspects, error/validation handler 140 and I/O unit 150 may cooperatively provide the execution environment for presenting the classified row data to the operator for validation.

Figure 8:
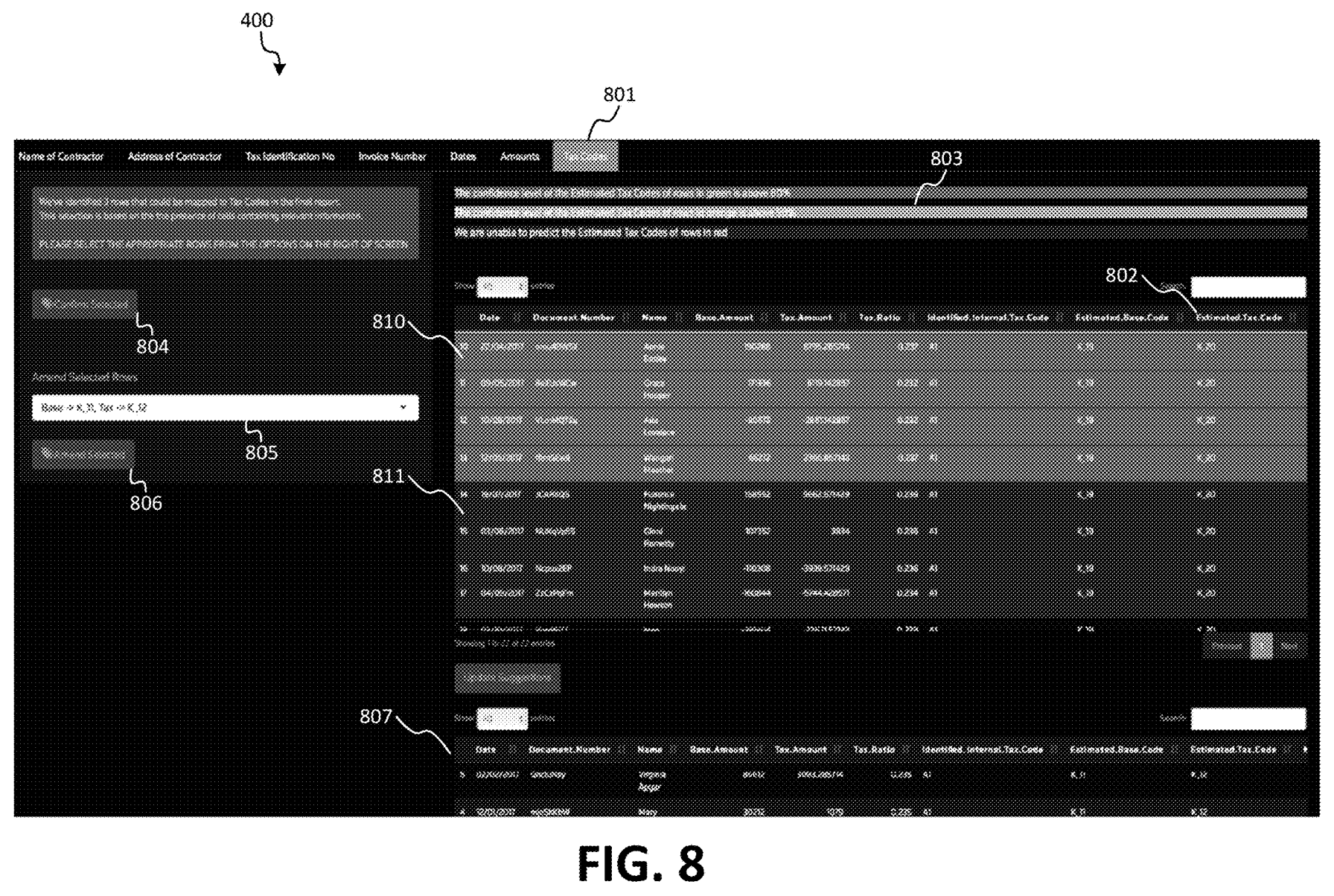

For example, FIG. 8 shows GUI 400, as described above with respect to FIG. 4, in which tab 801, "Tax Codes" is selected. Tab 801 shows the classified row data, along with the identified classification codes 802, and confidence level indicators 803. Confidence level indicators 803 may be provided as color indicators, where a first color may indicate that the confidence level of the estimated classification code may be above a threshold (e.g., above 80%), and a second color may indicate that the confidence level of the estimated classification code may be below the threshold (e.g., below 80%). In some aspects, more than two confidence level indicators may be provided, such as in the example illustrated in FIG. 8 in which three confidence level indicators are provided, the highest confidence level being above 80%, a medium confidence level being above 50%, and the lowest confidence level indicating an inability to estimate a classification code. In embodiments, the confidence level indicator may include a numerical confidence score. As will be appreciated, confidence level indicators 803 may facilitate validation of the estimated classification code by the operator.

In aspects, GUI control element 804 may be provided to execute validation of a selected row classification estimate. For example, an operator may select row 810, with a row classification estimate of K_20, and may confirm the row classification estimate by activating GUI control element 804. It is noted that the row classification estimate of row 810 has a high confidence level and this may allow the operator to efficiently determined whether the row classification estimate is correct. In another example, an operator may select row 811, with a row classification estimate of K_20, and having the lowest confidence level. In this case, the operator may amend the selected row using dropdown menu 805 to select the correct classification code, and confirming the selection using GUI control element 806.

In embodiments, as the operator confirms the classification estimates and/or amends the rows, confirmed and/or amended rows may be removed from the selectable list and may be moved to GUI portion 807. Additionally, as the operator confirms and/or amends the rows, the selectable list of rows may be updated in response to the operator's actions. For example, every confirmation and/or amendment may cause the system to re-evaluate the estimated row classifications based on the confirmation and/or amendment. In some cases, the updating may be performed after a threshold number of confirmations and/or amendments.

At block 212, a structured report is generated. In embodiments, the structured report may comprise a document that includes the mapped and classified transaction data structured according to the target structure defined for a particular jurisdiction for which the structured report may be generated. As noted above, different jurisdictions may require different structures for the report. In aspects, the structured report may be transmitted to the particular jurisdiction.

Figure 9:
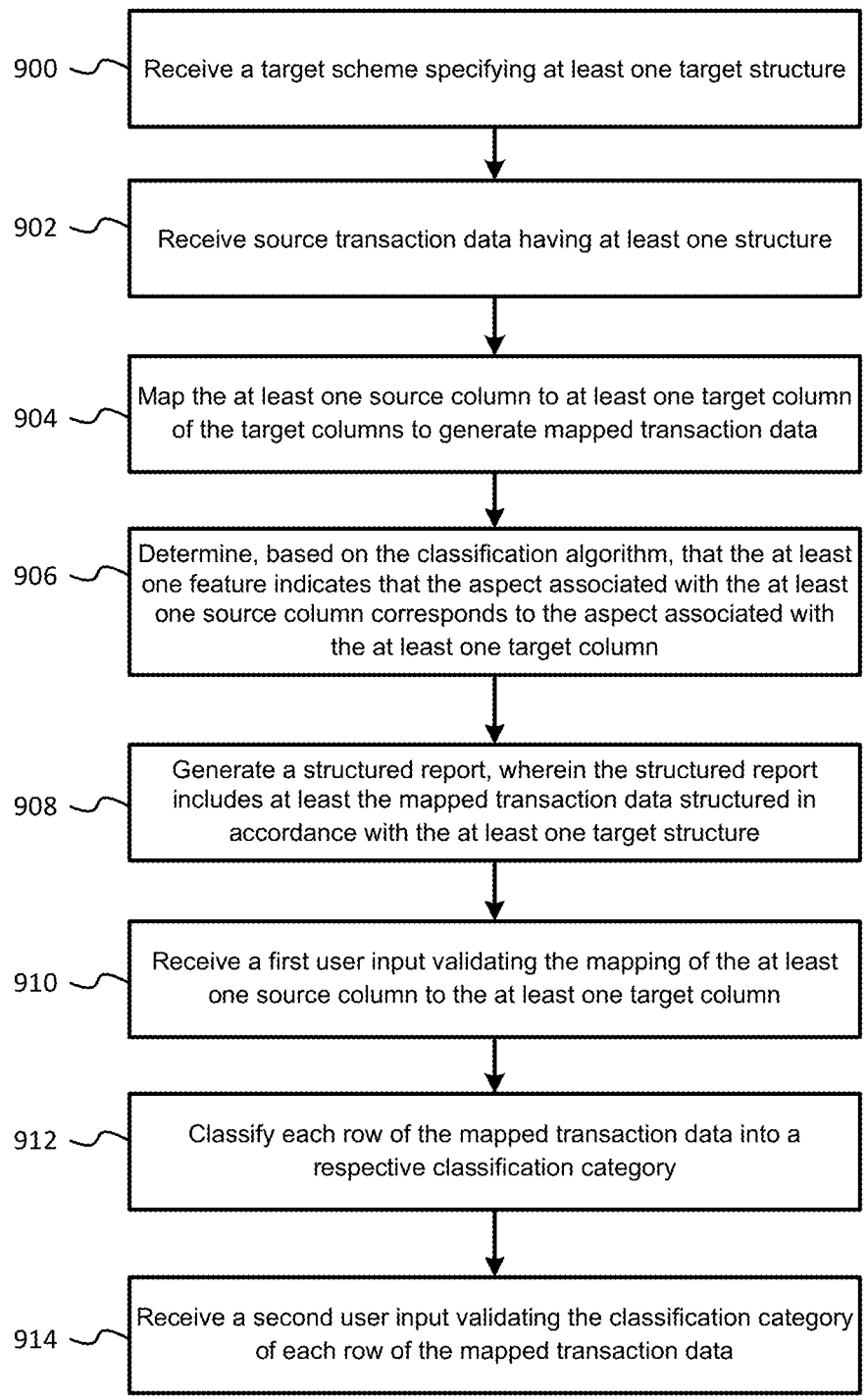
FIG. 9 shows an operational flow diagram illustrating example blocks executed to implement aspects of the present disclosure.

FIG. 9 shows a flow diagram illustrating example blocks executed to implement one aspect of the present disclosure. At block 900, a target scheme specifying at least one target structure is received. In embodiments, the least one target structure may define target columns to be included in a target document. The target columns defined by the at least one target structure may be associated with aspects of transaction data. For example, target columns may be associated with names (e.g., buyer, seller, contractor, etc.), addresses, amounts (e.g., gross amount, net amount, tax amount, etc.), classification codes, dates, transaction descriptions, etc.

At block 902, source transaction data having at least one data structure may be received. In embodiments, the at least one data structure of the received source transaction data may define at least one source column. Each column of the at least one source column may be associated with an aspect of the source transaction data. For example, columns of the at least one source column may be associated with names (e.g., buyer, seller, contractor, etc.), addresses, amounts (e.g., gross amount, net amount, tax amount, etc.), classification codes, dates, transaction descriptions, etc. The source transaction data may include source rows, with each row in the source rows corresponding to a different transaction.

At block 904, the at least one source column is mapped to at least one target column of the target columns to generate mapped transaction data. In some embodiments, the mapping of the at least one source column to the at least one target column may include identifying at least one feature of the at least one source column, and applying the identified at least one feature of the at least one source column to a classification algorithm. In embodiments, mapping of the at least one source column to the at least one target column may include identifying a plurality of candidate source columns that may potentially map to the target columns. Each candidate source column of the plurality of candidate source columns may have a defined probability, based on the identified features applied to the classification algorithm, of correctly mapping to a particular target column.

At block 906, a determination is made, based on the classification algorithm, that the at least one feature indicates that the aspect associated with the at least one source column corresponds to the aspect associated with the at least one target column. At block 908, a structured report is generated. In embodiments, the structured report may include at least the mapped transaction data structured in accordance with the at least one target structure. In embodiments, the structured report may be transmitted to a jurisdiction specifying the at least one target structure.

In some embodiments, the example flow diagram may also include further blocks. It is noted that, the operation flow of these further blocks may not be in the same order as described herein. For example, although block 910 may be described after blocks 906 and 908, in embodiments, block 910 may be executed after block 904 and before blocks 906 and 908. Similarly, although block 912 may be described after block 908, in embodiments, block 912 may be executed before block 908. At block 910, a first user input validating the mapping of the at least one source column to the at least one target column performed at block 904 may be received. In embodiments, the validating the mapping may include confirming the mapping, or rejecting the mapping and selecting a correct source column from the at least one source column to map to the at least one target column.

At block 912, each row of the mapped transaction data may be mapped into a respective classification category. In some embodiments, classifying each row of the mapped transaction data into the respective classification category may include calculating a confidence level for the classification, and providing an indication of the confidence level indicator to a user. At block 914, a second user input validating the classification category of each row of the mapped transaction data is received. In embodiments, the validating the classification category may include one of: confirming the classification category, and rejecting the classification category and selecting a correct classification category.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1 and 2 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method of enhanced mapping of data to a target document, the method comprising:
   obtaining, by one or more processors, one or more source documents from one or more data sources, wherein the one or more source documents comprise source transaction data, wherein the source transaction data comprises data having different formats, and wherein the different formats correspond to reporting requirements in one or more jurisdictions;
   mapping, by the one or more processors, the source transaction data from at least one of the one or more source documents to at least one target document structure to generate mapped transaction data, wherein the at least one target document structure has a format that corresponds to reporting requirements of a target jurisdiction that is different than at least one of the one or more jurisdictions, and wherein the mapping includes:
      identifying at least one feature of at least one source column defined in at least one data structure of the source transaction data, each of the at least one source column associated with an aspect of the source transaction data; and
      applying the identified at least one feature of the at least one source column to a classification algorithm, wherein the classification algorithm is configured to determine that the at least one feature indicates that an aspect associated with the at least one source column corresponds to an aspect associated with at least one target column of target columns defined in the at least one target document structure, the target columns associated with aspects of transaction data; and
   generating, by the one or more processors, a structured report that includes at least the mapped transaction data structured in accordance with the at least one target document structure.

2. The method of claim 1, wherein the source transaction data includes one or more source rows corresponding to a different transaction, and further comprising classifying each row of the mapped transaction data into a respective classification category.

3. The method of claim 2, further comprising:
   receiving a first user input validating a mapping of the at least one source column to the at least one target column, the validating the mapping including one of: confirming the mapping, and rejecting the mapping and selecting a correct source column from the at least one source column to map to the at least one target column; and
   receiving a second user input validating the classification category of each row of the mapped transaction data, the validating the classification category including one of: confirming the classification category, and rejecting the classification category and selecting a correct classification category.

4. The method of claim 2, wherein the classification of each row of the mapped transaction data into the respective classification category includes calculating a confidence level for the classification, and providing an indication of the confidence level to a user.

5. The method of claim 4, wherein the indication of the confidence level is based on a color scheme, the color scheme using a first color to indicate a confidence level above or equal to a predetermined threshold, and a second color to indicate a confidence level below the predetermined threshold.

6. The method of claim 1, wherein the at least one data structure includes a first data structure for a first jurisdiction of the one or more jurisdictions and a second data structure for a second jurisdiction of the one or more jurisdictions, the first data structure being different than the second data structure, and wherein the mapping the at least one source column to the at least one target column is performed separately for each of the first data structure and the second data structure.

7. The method of claim 1, wherein the aspects of transaction data include one or more of: names, addresses, transaction reference numbers, transaction descriptions, transaction dates, invoice dates, gross amounts, tax amounts, and net amounts.

8. The method of claim 1, wherein the at least one source column mapped to the at least one target column includes a plurality of candidate source columns, each candidate source column of the plurality of candidate source columns having a defined probability, based on the applying the identified at least one feature to the classification algorithm, of correctly mapping to the at least one target column.

9. The method of claim 8, wherein a confidence level indicator for each candidate source column corresponding to the defined probability is provided to a user.

10. The method of claim 1, wherein the identifying the at least one feature of the at least one source column includes applying a classification model to the transaction data of the at least one source column, wherein the classification model has been previously trained using labeled training data and previous knowledge of requirements of the target document.

11. The method of claim 1, further including receiving reference data associated with the source transaction data, the reference data including one or more of: invoices associated with the source transaction data, daily foreign exchange information, and a list of names and/or addresses of entities with which an organization associated with the source transaction data transacts on a regular basis.

12. The method of claim 1, further comprising:
   applying a trained machine learning classification model to one or more rows of the mapped transaction data to classify each of the one or more rows into a respective classification category.

13. The method of claim 12, wherein the trained machine learning classification model is trained based on labeled training data that corresponds to classification categories.

14. The method of claim 1, further comprising:
   applying a second trained machine learning classification model to the source transaction data to determine one or more errors in the source transaction data.

15. A system for enhanced mapping of data to a target document, the system comprising:
   a column mapping module executable by one or more processors and configured to:
      obtain one or more source documents from one or more data sources, wherein the one or more source documents comprise source transaction data, wherein the source transaction data comprises data having different formats, and wherein the different formats correspond to reporting requirements in one or more jurisdictions;
      map the source transaction data from at least one of the one or more source documents to at least one target document structure to generate mapped transaction data, wherein the at least one target document structure has a format that corresponds to reporting requirements of a target jurisdiction that is different than at least one of the one or more jurisdictions, and wherein the mapping includes:
- identifying at least one feature of at least one source column defined in at least one data structure of the source transaction data, each of the at least one source column associated with an aspect of the source transaction data; and
- applying the identified at least one feature of the at least one source column to a classification algorithm, wherein the classification algorithm is configured to determine that the at least one feature indicates that an aspect associated with the at least one source column corresponds to an aspect associated with at least one target column of target columns defined in the at least one target document structure, the target columns associated with aspects of transaction data; and a row classification module executable by the one or more processors and configured to classify each row of the mapped transaction data into a respective classification category, wherein the one or more processors are configured to generate a structured report that includes at least the mapped transaction data structured in accordance with the at least one target document structure.

16. The system of claim 15, further comprising:
a validation handler configured to:
- receive a first user input validating the mapping of the at least one source column to the at least one target column, the validating the mapping including one of: confirming the mapping, and rejecting the mapping and selecting a correct source column from the at least one source column to map to the at least one target column; and
- receive a second user input validating the classification category of each row of the mapped transaction data, the validating the classification category including one of:
confirming the classification category, and rejecting the classification category and selecting a correct classification category.

17. The system of claim 15, wherein the at least one source column mapped to the at least one target column includes a plurality of candidate source columns, each candidate source column of the plurality of candidate source columns having a defined probability, based on the application of the identified at least one feature to the classification algorithm, of correctly mapping to the at least one target column.

18. The system of claim 15, wherein the configuration of the row classification module to classify each row of the mapped transaction data into the respective classification category includes configuration to calculate a confidence level for the classification, and provide an indication of the confidence level to a user, wherein the indication of the confidence level is based on a color scheme, the color scheme using a first color to indicate a confidence level above or equal to a predetermined threshold, and a second color to indicate a confidence level below the predetermined threshold.

19. A computer-based tool for enhanced mapping of data to a target document, the computer-based tool including non-transitory computer readable media having stored thereon computer code which, when executed by a processor, causes a computing device to perform operations comprising:
- obtaining one or more source documents from one or more data sources, wherein the one or more source documents comprise source transaction data, and wherein the source transaction data comprises data having different formats, and wherein the different formats correspond to reporting requirements in one or more jurisdictions;
- mapping the source transaction data from at least one of the one or more source documents to at least one target document structure to generate mapped transaction data, wherein the at least one target document structure has a format that corresponds to reporting requirements of a target jurisdiction that is different than at least one of the one or more jurisdictions, and wherein the mapping includes:
  - identifying at least one feature of at least one source column defined in at least one data structure of the source transaction data, each of the at least one source column associated with an aspect of the source transaction data; and
  - applying the identified at least one feature of the at least one source column to a classification algorithm, wherein the classification algorithm is configured to determine that the at least one feature indicates that an aspect associated with the at least one source column corresponds to an aspect associated with at least one target column of target columns defined in the at least one target document structure, the target columns associated with aspects of transaction data; and
- generating a structured report that includes at least the mapped transaction data structured in accordance with the at least one target document structure.

* * * * *